United States Patent [19]

Hirakawa et al.

[11] 4,026,776

[45] May 31, 1977

[54] METHOD FOR PRODUCING HIGH PURITY LEAD

[75] Inventors: Seishiro Hirakawa; Ryoji Oniwa, both of Gifu, Japan

[73] Assignee: Mitsui Mining & Smelting Co., Ltd., Tokyo, Japan

[22] Filed: July 21, 1975

[21] Appl. No.: 597,714

Related U.S. Application Data

[63] Continuation of Ser. No. 443,634, Feb. 19, 1974, abandoned.

[30] Foreign Application Priority Data

Dec. 20, 1970 Japan ............................. 45-106560

[52] U.S. Cl. ................................. 204/117; 204/114
[51] Int. Cl.² ...................... C25C 1/16; C25C 1/22
[58] Field of Search ............................ 204/114, 117

[56] References Cited

UNITED STATES PATENTS 556,092   3/1896   Frölich .............................. 204/111

FOREIGN PATENTS OR APPLICATIONS 19,575   4/1970   Japan ................................ 204/114

OTHER PUBLICATIONS

EMF Series of Elements, Handbook of Chem. & Physics.
"Lead Plating of Shell Interiors & Boosters" by A. G. Reeve, Trans. Amer. Electrochem. Soc., vol. 35, 1919, pp. 26–27.
Electroplating Engineering Handbook, 2nd Ed. by A. K. Graham, 1962, pp. 231, 739.

Primary Examiner—R. L. Andrews
Attorney, Agent, or Firm—Armstrong, Nikaido & Marmelstein

[57] ABSTRACT

A high purity lead containing substantially no bismuth can be obtained by preferentially depositing and removing bismuth contained in slime filtrate and/or recovered electrolyte by electrolysis and recycling thus treated slime filtrate and/or recovered electrolyte as an electrolyte for lead electrolysis of the Betts process.

2 Claims, No Drawings

METHOD FOR PRODUCING HIGH PURITY LEAD

This is a continuation, of application Ser. No. 443,634, filed Feb. 19, 1974 now abandoned.

The present invention relates to a method for removing bismuth in lead electrolysis for producing high purity lead.

Generally, in lead refining process, a refined lead bullion is produced by subjecting a lead concentrate to sintering, melting and purifying steps. In this case, the kind of the final purification step depends upon the kind of impurities and when the lead bullion contains a large amount of bismuth, Betts' lead electrolysis process using a fluosilicate bath is employed.

Said Betts process comprises carrying out electrolysis with use of crude lead as anode, high purity lead (pure lead) as cathode and fluosilicic acid and lead fluosilicate as an electrolyte to deposit lead on the cathode and retain impurities contained in the crude lead, especially, Bi, Ag, Sb, Au, Cu, etc. in an anode slime. According to this process, lead and other impurities can be nearly completely separated utilizing the electrode potential difference in the fluosilicate bath.

Recently, regulation for content of impurities in the refined lead has become severer and so particular care should be given to removal of these impurities.

Especially, bismuth is caused to enter into cathode in a large amount and becomes the main impurity in the refined lead.

The causes for incorporation of bismuth into the refined lead obtained by lead electrolysis are as follows:

The first is that a part of Bi in anode is electrochemically dissolved out into electrolyte and deposited on cathode.

The second is physical cause that an anode slime is collapsed, migrates in the electrolyte and sticks to the cathode or the cathode and the anode are shorted to cause the anode slime to stick to the cathode.

For preventing the incorporation of Bi caused as mentioned above, it has been known to accomplish careful control of compositions of anode (contents of Bi, Sb, As, etc.), control of electrolysis conditions (current density, electrolyte temperature, electrolyte compositions, electrolyte recycle), control of electrolytic cell (checking of cell), etc.

There is another cause for incorporation of Bi, namely, incorporation caused by recycling of recovered liquids such as anode slime washing liquid, etc. to electrolysis step. That is, the anode slime washing liquid, etc. contain Bi dissolved out for various reasons and when they are recycled to electrolysis step, Bi is deposited on cathode because Bi is electrochemically nobler than Pb.

The anode slime contains not only Bi, but noble metals such as Au, Ag, etc. in a large amount and these can be recovered by an appropriate means. In this case, however, a large amount of fluosilicic acid contained in the electrolyte is incorporated into the anode slime and from economical viewpoint and for prevention of environmental pollution the recovery of said fluosilicic acid is important. That is, advantageous recovery of fluosilicic acid in the Betts' process has a great influence on reduction of cost for electrolysis. Furthermore, since the anode slime is usually subjected to pyro metallurgical treatment, when the fluosilicic acid-containing anode slime is treated as it is at the subsequent step, fluorine-containing materials are released in air and this should be avoided for prevention of environmental pollution. Therefore, said anode slime should be sufficiently washed and dehydrated and thereafter fed to the subsequent step for recovery of Au, Bi, etc.

The present invention provides a method for producing a high purity lead, characterized in that it includes a step of previously removing and recovering bismuth in said slime filtrate and/or recovered electrolyte and then using repeatedly thus treated slime filtrate and/or recovered electrolyte in lead electrolysis system as a recycle liquid.

In more detail, according to the present invention, slime filtrate and/or recovered electrolyte which contain Bi and which result from Betts' lead electrolysis process are charged in a usual lead electrolysis cell having crude lead or insoluble electrodes as anodes and refined lead or scrap anode in a usual lead electrolysis as cathodes and are electrolyzed therein to preferentially deposit Bi on the cathodes and remove it and thus obtained treated liquid as a recycle liquid is supplied again as an electrolyte for lead electrolysis.

The electrolytic cell used for removing Bi by electrolysis in the present invention has no limitation and may be the generally used lead electrolysis cell. For example, a lead electrolysis cell made of concrete, having asphalt linings and having a length of 2120 mm, a width of 760 mm and a depth of 915 mm may be used. The connection of electric paths is as follows: In case of Thofern Type 2.5 cells parallel and 5 cells cascade, cathodes are scrap anodes, the number of cathodes is 18 in one cell and size thereof is 740 mm in length, 605 mm in width and 5 – 10 mm in thickness and anodes comprising crude lead of low Bi content, the number thereof is 17 in one cell (weight is 120 – 130 kg/one sheet) and size thereof is substantially the same as that of the cathode. Hanging method is shoulder type, distance between the anodes is 110 mm, cell voltage is 0.12 V, temperature of electrolyte is normal temperature, current density is 50 – 110 amp/m$^2$, compositions of electrolyte are Pb 150 – 200 g/l, total H$_2$SiF$_3$ 125 – 190 g/l and free H$_2$SiF$_6$ 20 – 50 g/l. Electrolysis is carried out until weight of anode becomes 30 – 40 Kg/sheet. The slime filtrate and/or recovered electrolyte are supplied at a rate of 5 – 20 l/min., electrolysis is carried out at 6000 – 15000 l/day, and after 15 days, cathodes are taken out, molten and re-casted into anodes for lead electrolysis together with crude lead produced.

The purified slime filtrate and/or recovered electrolyte are again repeatedly used for lead electrolysis as recycle liquid. Thus, hitherto, anode slime cannot be sufficiently washed because there is the possibility of bismuth being dissolved out into the washing liquid, but according to the present invention, such problem can be solved and moreover there are various advantages such as possible recovery of fluosilicic acid, etc.

The present invention will be illustrated by the following examples.

An electrolytic cell was filled with a given amount of a slime filtrate and a recovered electrolyte and electrolysis was carried out. Changes of Bi content after lapse of times are shown below.

Table 1

| At start | Bi in electrolyte (mg/l) | | |
|---|---|---|---|
| | After 2 hours | After 4 hours | After 6 hours |
| 170 | 95 | 50 | 30 |

Note:
The above is the case where an electrolyte which was highly polluted with Bi was subjected to purification treatment. Treated amount: 5000l, Amount of current: 4500 A Table 2

| | Bi in electrolyte (mg/l) | | | | | |
|---|---|---|---|---|---|---|
| | 1 | 2 | 3 | 4 | 5 | 6 |
| Before purification | 49.4 | 26.2 | 40.9 | 60.7 | 64.4 | 55.0 |
| After purification | 2.7 | 5.9 | 2.6 | 2.6 | 3.9 | 1.7 |

Note:
The above is the case where the usual slime washing liquid was subjected to purification treatment. Treated amount: 2500l Amount of current: 4500 A × 7 hrs.

As is clear from above Tables 1 and 2, removal percentage of Bi according to the present invention reaches as high as 85 – 95% and the slime filtrate and/or recovered electrolyte could sufficiently be used as a recycle liquid.

In a factory having a lead production scale of 60 t/day using anodes containing about 0.5% of Bi, when amount of slime washing filtrate is about 10 m³/day and no purification treatment is carried out and if Bi content in the filtrate is about 30 – 60 mg/l (maximum 360 mg/l) as in the above Example, Bi content in product lead is 5 – 10 ppm (maximum 60 ppm). Therefore, even if incorporation of Bi due to other causes is kept below 5 ppm by severe control, Bi content in the final product lead becomes about 10 – 15 ppm (maximum 70 ppm), while according to the present invention, the content of Bi in the product lead could be decreased below 10 ppm.

What is claimed is:

1. In a method for producing a high purity lead by the Betts process which comprises carrying out electrolysis in the presence of an electrolyte bath containing fluorosilicic acid and lead fluorosilicate, said process employing crude lead as the anode and high purity lead as the cathode, wherein lead is deposited on the cathode, the improvement which comprises separately treating a resulting slime filtrate and/or recovered electrolyte of the process by subjecting said filtrate and/or electrolyte to electrolysis in a cell having an anode of crude lead or an insoluble electrode and a cathode of refined lead or scrap anode to preferentially deposit bismuth on the cathode to remove bismuth therefrom and recycling the resulting filtrate and/or electrolyte for use in the process as the electrolyte for producing high purity lead.

2. A method according to claim 1, wherein the electrolysis of the slime filtrate and/or recovered electrolyte is carried out at a current density of 50 – 110 Amp/m² and at room temperature in an electrolyte bath containing 150 – 200 g/l of lead and 20 to 50 g/l of free fluorosilicic acid.

* * * * *